United States Patent [19]

Bedogni

[11] Patent Number: 4,917,138

[45] Date of Patent: Apr. 17, 1990

[54] PRIORITY FLOW CONTROL VALVE FOR HYDRAULIC POWER CIRCUITS

[75] Inventor: Giorgio Bedogni, Reggio Emilia, Italy

[73] Assignee: Oleostar S.r.L., Reggio Emilia, Italy

[21] Appl. No.: 211,097

[22] Filed: Jun. 13, 1988

[30] Foreign Application Priority Data

Jul. 17, 1987 [IT] Italy .............................. 40091 A/87

[51] Int. Cl.[4] .............................................. G05D 7/01

[52] U.S. Cl. .................................... 137/101; 137/117

[58] Field of Search ................................ 137/101, 117

[56] References Cited

U.S. PATENT DOCUMENTS 4,303,091 12/1981 Hertell ................................ 137/117

4,372,335 2/1983 Sato ................................ 137/117 X

FOREIGN PATENT DOCUMENTS 1195903 10/1985 Canada ................................ 137/101

2414059 3/1974 Fed. Rep. of Germany ...... 137/101

*Primary Examiner*—Robert G. Nilson

[57] ABSTRACT

A priority flow control valve for power circuits in hydraulic equipment, which is conventional in basic design, but makes use of an additional piston to impinge on the movable seat of a bias spring housed in a cylindrical chamber that connects with the constant flow passage to the priority outlet; the additional piston operates internally of a chamber having cross-sectional area greater than that of the chamber housing the spring, and is exposed to high pressure flow that can be routed into the chamber either from the priority outlet, or from the valve's main inlet, which will be connected to the high pressure line from the pump.

6 Claims, 2 Drawing Sheets

PRIORITY FLOW CONTROL VALVE FOR HYDRAULIC POWER CIRCUITS

BACKGROUND of the INVENTION

1. Field of the Invention

The invention relates to a priority flow control valve for hydraulic power circuits.

2. The Prior Art

Existing prior art embraces flow control valves consisting substantially in a housing with an inlet, connected to the high pressure outlet of a hydraulic pump, and a main cylindrical bore; the bore slidably accommodates a piston by which it is split into two chambers, and receives oil direct from the inlet. The first cylindrical chamber is connected with the second cylindrical chamber by way of a passage that incorporates a flow control element, so that the second chamber is in receipt of oil under pressure at a steady rate of flow for operation of a given service. Accordingly, the second chamber connects with a fixed flow outlet, supplying the priority circuit, whilst the first connects with an outlet that may either unload the oil to the tank or direct it toward another service. The piston is of length such as to block either one or the other outlet at any given moment, and associates by way of a rod, occupying the second chamber, with a second piston that is biased in one direction by a spring housed in a further chamber connected hydraulically with the second chamber.

The valve is solenoid-operated, and will be wired in such a way that energization of the coil activates the constant flow outlet, that is, the priority circuit.

Flow control valves of the type outlined above are widely utilized to operate the wrecking actuators with which excavators are equipped. It has emerged, however, that this conventional valve design betrays a number of drawbacks, one of which being that the priority outlet is not always faultlessly blocked when not in use; thus it can happen that there is a continual leakage of oil, sufficient to occasion movement of the actuator, the consequences of which can be extremely hazardous when such movement is not desirable. Indeed, manufacturers stipulate a minimum pressure rise for such valves.

In another version of this same type of flow control valve, the leakage of oil is prevented by installing a preloaded backpressure valve to balance the force of the spring. Leakage is prevented by the adoption of this expedient, certainly, though one has a further drawback in that there is a permanent pressure drop during operation of any one of the excavator's different services. The resultant power loss will automatically dictate additional heat, which must be dissipated; practical experience shows that power losses of between 2 and 7 horsepower can occur, depending on pump flow, and it is absolutely essential that this surplus heat be dispersed.

The object of the invention is to overcome the problems aforementioned, and in particular to embody a priority flow control valve in which the priority outlet is guaranteed to close efficiently, so that power losses will not occur during normal operation of the machine in which it is installed.

SUMMARY of the INVENTION

The stated object is achieved comprehensively with a priority flow control valve for hydraulic power circuits according to the invention.

The valve disclosed is of the type having an inlet, connecting with a cylindrical bore; a piston, slidably accommodated by the bore, that opens and closes an unloading passage and a passage through which oil is directed at a constant rate of flow; and a second piston, slidably accommodated together with a relative bias spring internally of a chamber disposed coaxial with the bore.

The essential feature of the priority valve as disclosed is that it makes use of a further chamber, in receipt of oil under pressure, the cross-sectional area of which is greater than that of the chamber occupied by the bias spring, and a piston, slidably accommodated in this wider chamber and associated with a rod that impinges on a movable plate against which the bias spring is seated.

BRIEF DESCRIPTION of the DRAWINGS

Two preferred embodiments of the invention will now be described in detail, by way of example, with the aid of the accompanying drawings, in which.

DESCRIPTION of the PREFERRED EMBODIMENTS

Figure 1:
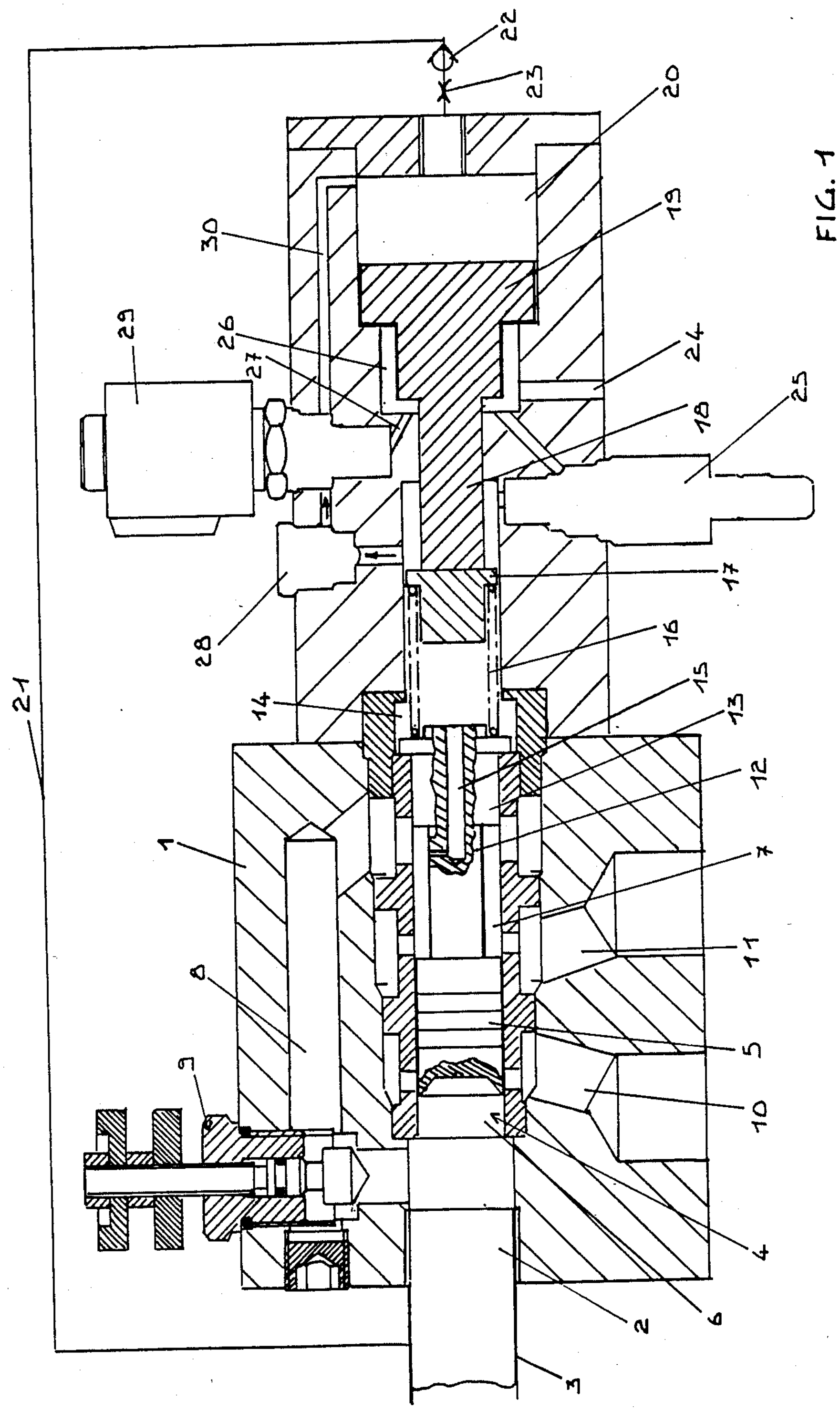
FIG. 1 is the longitudinal section through a first embodiment of the valve.

Referring to FIG. 1 of the drawings, 1 denotes the housing of the valve affording an inlet 2 into which oil is directed at high pressure through a line denoted 3. The inlet 2 connects with a cylindrical bore 4 internally of which a piston 5 is slidably accommodated, and positioned in such a way as to create two chambers 6 and 7. The first cylindrical chamber 6 connects with the second 7 by way of a passage 8 incorporating a flow control element 9 of conventional embodiment; oil thus enters the second chamber 7 at a constant rate of flow. The first chamber 6 connects, by way of a passage denoted 10, with a port that either unloads the oil to tank or directs it to another service, whereas the second chamber 7 connects, by way of a passage denoted 11, with a port from which oil is supplied at a constant rate of flow to a service, such as the actuator of a wrecking implement.

The piston 5 can be positioned along the bore 4 so as to block the one passage and open the other passage 11, and vice versa.

12 denotes a rod connecting the piston 5 with a second piston 13, slidably accommodated in a further chamber 14 that is disposed coaxially with the bore 4. This chamber 14 and the bore 4 are interconnected hydraulically by way of a drilling 15 formed through the rod 12 and the second piston 13.

16 denotes a coil spring set between the second piston 13 and a movable plate 17; spring and plate alike are accommodated by the chamber denoted 14. The plate 17 is positioned with one side offered to the spring 16, and its opposite side engaged by the rod 18 of a further piston 19 slidably accommodated in a cylindrical chamber 20 of cross-sectional area greater than that of the chamber 14 occupied by the spring 16. This larger chamber 20 is connected with the high pressure oil line 3 by way of a line 21 incorporating a restriction 23, and if considered desirable, a check valve 22; needless to say, the line 21 in question might be routed directly through the valve housing 1.

24 and 25 denote a drain line and a conventional relief valve, respectively, both of which connect with a chamber 26 that is also open, via a relative passage 27, to the solenoid valve 29 by which the entire flow control valve is operated. The relief valve serves to relieve pressure from chamber 14 to drain 25. 28 denotes a check valve, with direction of flow denoted by arrows, installed in a passage 30 that connects the bias spring chamber 14 with the large diameter chamber 20; accordingly, these two chambers can be isolated from one another.

The advantages of the valve will be evident from the foregoing description; the most obvious is that of having obtained a notable reduction in pressure fluctuations with the valve in the de-energized configuration, obtained by pilot operation utilizing flow from the high pressure inlet and exploiting two construction expedients, namely, the difference in pressure between the chambers denoted 14 and 20, and the difference in cross-sectional area between these same two chambers. A further advantage is that the priority outlet 11 remains securely blocked with the valve de-energized.

Figure 2:
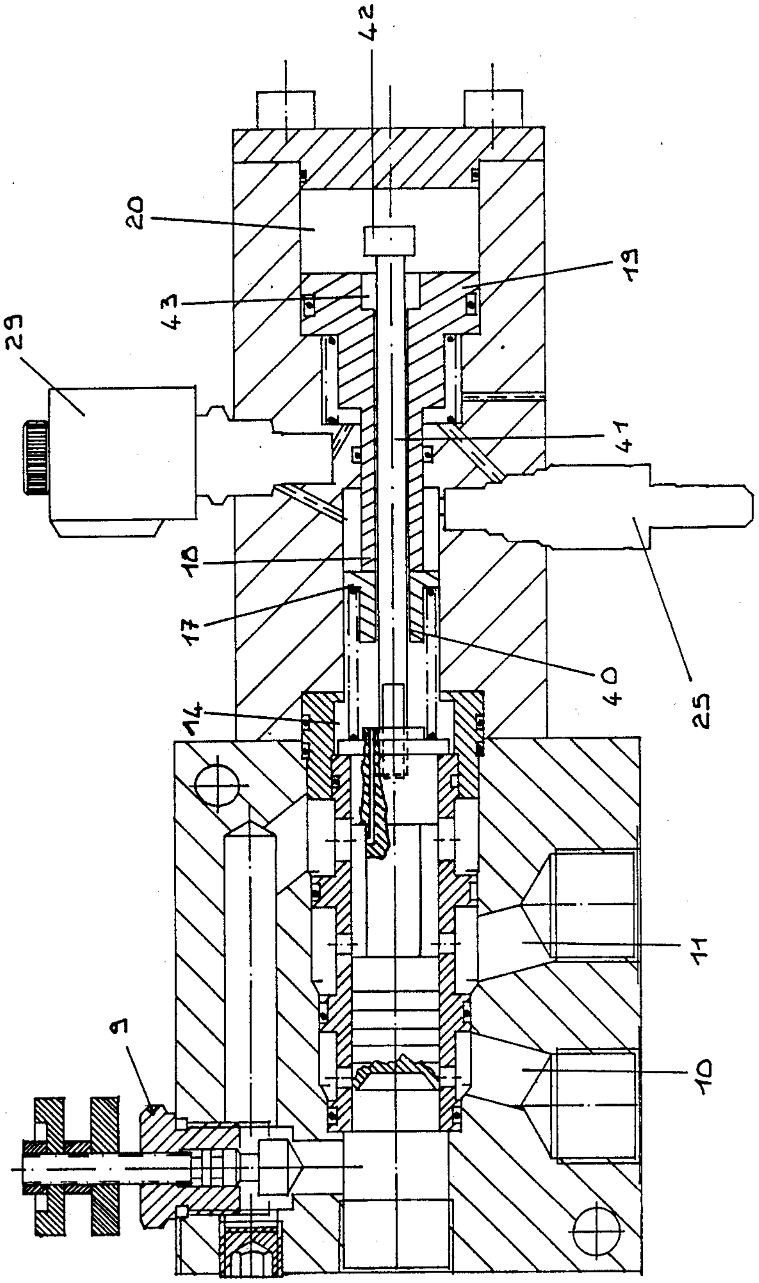
FIG. 2 is the longitudinal section through a second embodiment of the valve.

FIG. 2 illustrates an alternative embodiment of the valve in which operation is piloted by directing oil from the spring chamber 14 through a passage 40 formed in the movable plate 17, the rod 18 and the piston 19; the passage 40 slidably accommodates a stem 41 provided with a poppet 42 that registers to an exact fit in a corresponding seat 43. With this arrangement, pressure fluctuation is reduced solely by virtue of the difference in cross-sectional area between the two chambers 14 and 20, since their pressures are substantially the same.

What is claimed is:

1. A priority flow control valve for hydraulic power circuits, comprising:

an inlet, connecting with a cylindrical bore;

a first piston, slidably accommodated by the bore, that opens and closes an unloading passage and a passage through which oil is directed at a constant rate of flow;

a second piston, slidably accommodated together with a relative bias spring internally of a first chamber disposed coaxial with the bore;

a second chamber, in receipt of oil under pressure, the cross-sectional area of which is greater than that of the first chamber occupied by the bias spring, and a second piston, slidably accommodated in the second chamber of greater cross-sectional area in associated with a rod that impinges on a movable plate against which the bias spring is seated.

2. A valve as in claim 1, wherein the second chamber exhibiting cross-sectional area greater than that of the first chamber occupied by the spring is connected hydraulically with the inlet of the valve.

3. A valve as in claim 1, wherein the first chamber occupied by the spring and the second chamber of greater cross-sectional area occupied by the second piston are interconnected hydraulically.

4. A valve as in claim 1 wherein the second chamber of greater cross-sectional area and the first chamber occupied by the spring are interconnected by way of a passage incorporating a check valve.

5. A valve as in claim 1 wherein the second chamber of greater cross-sectional area connects with the inlet by way of a passage incorporating a restriction.

6. A valve as in claim 1, wherein the second chamber of greater cross-sectional area connects with the inlet by way of a passage incorporating a check valve.

* * * * *